United States Patent
Kakani et al.

(10) Patent No.: US 10,624,055 B2
(45) Date of Patent: *Apr. 14, 2020

(54) METHOD FOR DETERMINING LOCATION OF WIRELESS DEVICES

(71) Applicant: CSR TECHNOLOGY INC., Sunnyvale, CA (US)

(72) Inventors: Naveen Kumar Kakani, Irving, TX (US); Benjamin Tarlow, Cambridge (GB); Erik David Lindskog, Cupertino, CA (US); Raja Banerjea, San Jose, CA (US); Hong Wan, Fremont, CA (US); Ian Charles Blair, Cambridge (GB)

(73) Assignee: CSR Technology Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/256,433

(22) Filed: Jan. 24, 2019

(65) Prior Publication Data

US 2019/0159161 A1     May 23, 2019

Related U.S. Application Data

(63) Continuation of application No. 15/712,504, filed on Sep. 22, 2017, now Pat. No. 10,219,241, which is a
(Continued)

(51) Int. Cl.
*H04W 24/00* (2009.01)
*H04W 64/00* (2009.01)
(Continued)

(52) U.S. Cl.
CPC .............. *H04W 64/00* (2013.01); *G01S 5/08* (2013.01); *G01S 5/14* (2013.01); *G01S 11/02* (2013.01); *H04W 4/023* (2013.01); *H04W 4/025* (2013.01)

(58) Field of Classification Search
CPC ....... H04W 4/023; H04W 4/025; G01S 11/02; G01S 5/08
See application file for complete search history.

(56) References Cited

U.S. PATENT DOCUMENTS

| | | | |
|---|---|---|---|
| 3,406,397 A | 10/1968 | Easton et al. | |
| 6,697,629 B1 | 2/2004 | Grilli et al. | |

(Continued)

FOREIGN PATENT DOCUMENTS

| | | |
|---|---|---|
| CN | 103037504 A | 4/2013 |
| CN | 103857035 A | 6/2014 |

(Continued)

OTHER PUBLICATIONS

GB Search Report issued in related GB Appln. No. 1322872.1, dated Aug. 18, 2014, 1 page.
(Continued)

*Primary Examiner* — Khalid W Shaheed
(74) *Attorney, Agent, or Firm* — The Marbury Law Group, PLLC (57) ABSTRACT

To determine a location of a client device in a wireless network having at least first and second network devices, with known locations, one of the network devices transmits a message to the other network device and the other network device responds with an acknowledgement message. A client device receives the message and the acknowledgement message as well as respective times indicating actual times at which the message and the acknowledgement message were processed by one of the first and second network devices. The client device determines its location based on the times at which it received the message and the acknowledgement message and the difference between the actual processing times. This location may be refined by determining an angle between the client device and at least (Continued)

one of the network devices having multiple antennas and being configured for steered beam communications.

26 Claims, 7 Drawing Sheets

Related U.S. Application Data continuation of application No. 13/964,431, filed on Aug. 12, 2013, now Pat. No. 10,039,073.

(60) Provisional application No. 61/748,542, filed on Jan. 3, 2013.

(51) Int. Cl.
| | | |
|---|---|---|
| *G01S 5/08* | (2006.01) | |
| *G01S 5/14* | (2006.01) | |
| *G01S 11/02* | (2010.01) | |
| *H04W 4/02* | (2018.01) | |

(56) References Cited

U.S. PATENT DOCUMENTS

| | | | |
|---|---|---|---|
| 7,304,610 B2 | 12/2007 | Ninomiya et al. | |
| 7,881,684 B2 | 2/2011 | Nakagawa et al. | |
| 8,073,465 B2 | 12/2011 | Nakagawa et al. | |
| 8,165,150 B2 | 4/2012 | Aweya et al. | |
| 9,247,517 B2 | 1/2016 | Wigren et al. | |
| 9,907,047 B1 | 2/2018 | Vamaraju et al. | |
| 10,039,073 B2 | 7/2018 | Kakani et al. | |
| 10,219,241 B2 | 2/2019 | Kakani et al. | |
| 2004/0047324 A1 | 3/2004 | Diener | |
| 2004/0224707 A1 | 11/2004 | Jou | |
| 2005/0020275 A1 | 1/2005 | Agrawala et al. | |
| 2008/0031222 A1 | 2/2008 | Nanda et al. | |
| 2008/0112380 A1 | 5/2008 | Fischer et al. | |
| 2008/0291883 A1 | 11/2008 | Seok | |
| 2010/0271263 A1* | 10/2010 | Moshfeghi | G01S 5/0263 342/378 |
| 2012/0026991 A1* | 2/2012 | Niu | H04B 7/0417 370/338 |
| 2012/0106370 A1 | 5/2012 | Radulescu et al. | |
| 2012/0136923 A1 | 5/2012 | Grube | |
| 2012/0224590 A1 | 9/2012 | Norair | |
| 2012/0229334 A1 | 9/2012 | Waters et al. | |
| 2012/0262339 A1 | 10/2012 | Garcia et al. | |
| 2012/0276921 A1 | 11/2012 | Nemeth | |
| 2012/0302254 A1* | 11/2012 | Charbit | H04W 4/70 455/456.1 |
| 2013/0157692 A1 | 6/2013 | Hall et al. | |
| 2013/0252629 A1* | 9/2013 | Wigren | G01S 5/0236 455/456.1 |
| 2013/0273935 A1 | 10/2013 | Amizur et al. | |
| 2014/0073352 A1 | 3/2014 | Aldana et al. | |
| 2014/0132444 A1 | 5/2014 | Bird | |
| 2014/0154996 A1 | 6/2014 | Banin et al. | |
| 2014/0160941 A1 | 6/2014 | Hui et al. | |
| 2014/0187259 A1 | 7/2014 | Kakani et al. | |
| 2014/0198725 A1 | 7/2014 | Abraham et al. | |
| 2014/0200026 A1 | 7/2014 | Aldana | |
| 2014/0213193 A1 | 7/2014 | Zhang et al. | |
| 2014/0254511 A1 | 9/2014 | Aldana et al. | |
| 2014/0293851 A1 | 10/2014 | Abraham et al. | |
| 2014/0295877 A1 | 10/2014 | Hart et al. | |
| 2014/0327579 A1* | 11/2014 | Hart | H04W 64/006 342/374 |
| 2015/0063228 A1 | 3/2015 | Aldana et al. | |
| 2015/0094103 A1 | 4/2015 | Wang et al. | |
| 2015/0139213 A1 | 5/2015 | Abraham et al. | |
| 2015/0181553 A1 | 6/2015 | Segev | |
| 2015/0382152 A1 | 12/2015 | Lindskog et al. | |
| 2016/0037477 A1 | 2/2016 | Cheng et al. | |
| 2016/0309472 A1 | 10/2016 | Yong et al. | |
| 2016/0366606 A1 | 12/2016 | Steiner | |

FOREIGN PATENT DOCUMENTS

| | | | |
|---|---|---|---|
| EP | 2511730 A1 | 10/2012 | |
| JP | 2009229393 A | 10/2009 | |
| JP | 2012530394 A | 11/2012 | |
| WO | 9929130 A1 | 6/1999 | |
| WO | 0215614 A1 | 2/2002 | |
| WO | 0232184 A2 | 4/2002 | |
| WO | 2008147046 A1 | 12/2008 | |
| WO | 2012155993 A1 | 11/2012 | |
| WO | 2015010734 A1 | 1/2015 | |
| WO | 2015031029 A1 | 3/2015 | |
| WO | 2016081271 A1 | 5/2016 | |

OTHER PUBLICATIONS

IEEE: "IEEE P802.11-REVmc/D7.0", Part 11: Wireless LAN Medium Access Control (MAC) and Physical Layer (PHY) Specifications, Aug. 12, 2016, XP055407935, Retrieved from the Internet: URL:http://ieeexplore.ieee.org/stamp/stamp.jsp?tp=&arnumber=7542452 [retrieved on Sep. 19, 2017], 118 pages.
International Preliminary Report on Patentability—PCT/US2015/037543, The International Bureau of WIPO—Geneva, Switzerland, dated Feb. 9, 2017. 7 pages.
International Search Report and Written Opinion—PCT/US2017/039301—ISA/EPO—dated Sep. 27, 2017. 20 pages.
International Search Report and Written Opinion—PCT/US2015/037543—ISA/EPO—dated Sep. 14, 2015. 9 pages.
Lindskog E (CSR Technology): "Client Positioning using Timing Measurements between Access Points; 11-13-0072-00-000m-client-positioning-using-timing-measurements-between-access-points", IEEE SA Mentor; 11-13-0072-00-000M-Client-Positioning-Using-Timing-Measurements-Between-Access-Points, IEEE-SA Mentor, Piscataway, NJ USA, vol. 802.11m, Jan. 12, 2013, pp. 1-13, XP068040470, [retrieved on Jan. 12, 2013] p. 4-p. 6 p. 11.

* cited by examiner

FIG. 1

(Prior Art)

METHOD FOR DETERMINING LOCATION OF WIRELESS DEVICES

This application is a continuation of U.S. Non-Provisional patent application Ser. No. 15/712,504 entitled "Method For Determining Location of Wireless Devices", filed Sep. 22, 2017, which is a continuation of U.S. Non-Provisional patent application Ser. No. 13/964,431, entitled "Method For Determining Location of Wireless Devices", filed Aug. 12, 2013, which claims the benefit of U.S. Provisional Application No. 61/748,542, entitled "Method For Determining Location Of Wireless Devices", filed Jan. 3, 2013, each of which is assigned to the assignee hereof and incorporated herein by reference in its entirety for all purposes.

BACKGROUND OF THE INVENTION

Determining the location of a portable device, such as a wireless telephone typically uses GPS or trilateration of mobile telephone signals broadcast from cell towers at known positions. These methods, however do not work well indoors due to the limited availability of GPS satellite signals and mobile telephone signals. Indoor positioning is important for determining the location of a portable device in buildings such as malls, hotels, offices, train stations etc.

SUMMARY

A method for determining a location of a client device in a wireless network having at least first and second network devices, with known locations, includes transmitting a message from the first network device to the second network device, receiving the message at the second network device and transmitting an acknowledgement message. The method further includes transmitting, at least one further message from the second network device to the first network device, this message includes the actual time of reception of the message and the actual time of transmission of the acknowledgement message. The method also includes, receiving, by the client device, the message and the further message and calculating the location of the client device from the times at which the message and the further message were received by the client device, the timing information in the further message and the known locations of the network devices.

According to one aspect of the method, another message may be transmitted from the first network device to the second network device that includes the transmission time of the message and the reception time of the acknowledgement message and the client device includes these times in its calculation of the position of the client device.

According to yet another aspect of the method, both the second network device and the client device may send their received timing information in an additional message to a further network entity along with the details of the locations or identifications of the first and second network device. The further network entity may use this Information to calculate the location of the client device.

DETAILED DESCRIPTION OF THE INVENTION

Increasingly, indoor locations such as malls, hotels, offices and train stations, provide multiple WiFi access points that, as long they operate according to an appropriate protocol, can be used for to determine the location of a WiFi capable device with high accuracy.

Proposed methods for performing WiFi location include Round Trip Time (RTT) measurements and other methods using Time of Arrival (ToA) and Time of Departure (ToD) measurements. The materials that follow disclose: 1) a method to compute location using RTT which reduces the burden on the client, 2) a first receive-only location method which reduces communications overhead and may reduce power consumption by the client device and 3) a second receive only method for use in Wi-Fi systems employing beamforming. Although the invention is described in terms of a WiFi network, it is contemplated that it may be used for other wireless technologies including, without limitation, LTE, 3GPP, Bluetooth®, Zigbee® and WiGig.

Time of flight (ToF) methods to compute location include RTT measurements as described in IEEE 802.11v. These methods determine location by measuring the RTT of signals between a client device and one or more access points.

Figure 1:
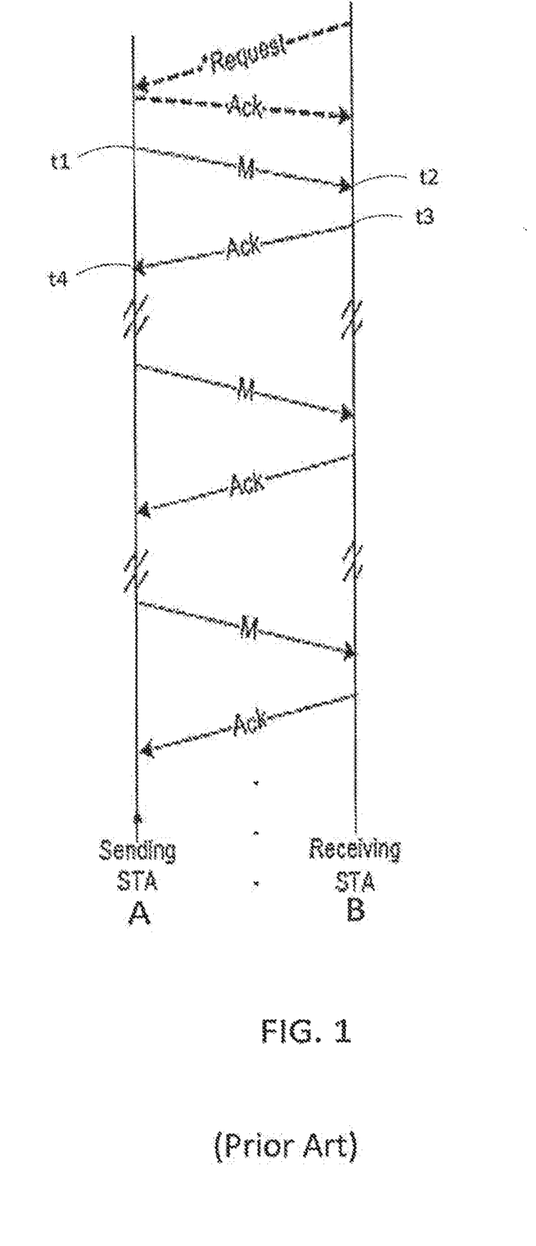
FIG. 1 (prior art) is a network communications diagram that is useful for describing a prior-art method for determining location of a client device based on round-trip time.

With reference to FIG. 1, the ToF between two stations, STA A and STA B, may be computed according to equation (1).

$$\text{ToF}=[(t2-t1)+(t4-t3)]/2. \qquad (1)$$

Note that the times t1 to t4 are all assumed to be measured as the signal leaves or is received at the antenna port. It is desirable to carefully calibrate the transmit (Tx) and receive (Rx) radio-frequency (RF) delays through the analogue elements of the transceivers before making these measurements. The calibration of these delays may be relatively easy for an access point device but may not be cost-effective for a less expensive client device.

In FIG. 1, it is noted that six packets are transmitted over the medium for every measurement. In an indoor location such as in a train station or in a shopping mall, where 400 users are maintaining their locations by sending an automated location request every five seconds, each pair of transactions would use (100+16+44)μs where 100 μs is the typical time to transmit the location request message M1, 16 μs is the SIFS duration and 44 μs is the ACK duration. As 3 pairs of these measurements are used with each AP and this measurement is done using 3 APs, the total medium occupancy time would be 160 μs*3*3*400/5 s=11.52% of the total available time. This calculation does not include retransmissions caused by erroneous or overlapping packets. Therefore it is reasonable to assume that the use of this location technique would reduce the wireless throughput substantially. There would also be additional power consumption incurred by the client device to transmit and receive the packets.

One embodiment of the subject invention concerns a method for performing location measurements and calculations that relaxes the requirement on the knowledge and calibration of the RF delays of the client device.

Figure 2:
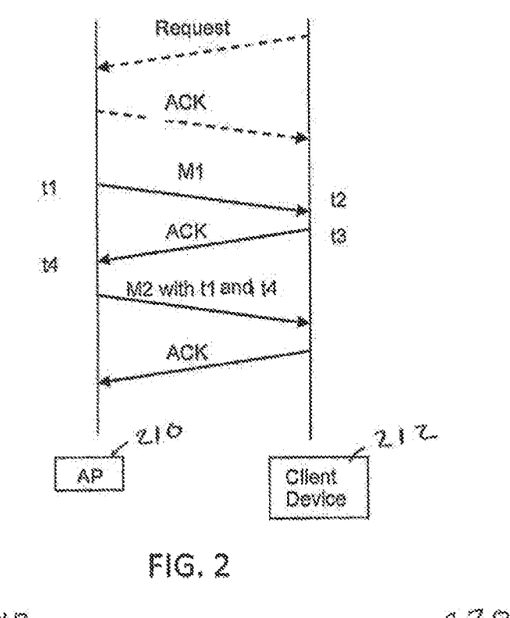
FIGS. 2, 3, 5, 6A, 6B, 7 and 8 are network communications diagrams that are useful for describing example embodiments of the invention.

In this method the client device essentially measures the time-of-arrival (ToA) and the time-of-departure (ToD) at the analogue-to-digital (ADC) and digital to analogue (DAC) interfaces rather than at the antenna port. The measurements may be done in other parts of the transmit and receive chain as long as the delay between the measurement point and the packet being transmitted over the air is fixed and the delay between the packet receive at the antenna and the measurement point is fixed. Using these measurements relaxes the requirements on the knowledge of Rx and Tx RF delays of the client device, FIG. 2 illustrates a solution using parabolic equations. In FIG. 2 the RTT transmission and the measured times is depicted for the case when the RTT transmission starts and ends at AP 210. Note that according to the protocol shown in FIG. 2 the client device 212 nominally is the device that requests this transmission exchange, according to the 802.11 standard. It is preferable for the client device 212 to request the RTT transmission as it may change channels to address various APs with relative ease in order to initiate the RTT measurement with the different APs. While this embodiment of the invention is described as using APs, it is contemplated that it may use any station (STA) in the wireless network that has a known location and operates according to a protocol similar to that described below.

When the client device 212 does not have good knowledge of its Tx and Rx RF delays, it may be desirable to devise a methodology that minimally relies on this knowledge. This can be achieved by considering differential RTT times from a client device to multiple APs.

Consider the two-dimensional example below where the client device requests measurements relative to 3 APs (not shown in FIG. 2), AP 1, AP 2 and AP 3. A two-dimensional embodiment may be useful, for example, in a region having APs with a single elevation above the floor that is sufficiently close to the elevation of the client devices that any error caused by the difference in elevation may be ignored. This may be the case, for example, when STAs having known positions are used in place of APs. The measurements for AP 1, AP 2, and AP 3 are shown in Tables 1, 2 and 3, below.

TABLE 1

Measurements with AP 1:

ToD at AP 1 at Antenna port = $t_{11}$
ToA at client device antenna port = $t_{12}$
ToA at client device ADC = $t_{12}'$
ToD at client device DAC = $t_{13}'$
ToD at client device antenna port = $t_{13}$
ToA at antenna port of AP 1 = $t_{14}$

TABLE 2

Measurements with AP 2:

ToD at AP 2 at antenna port = $t21$
ToA at client device antenna port = $t22$
ToA at client device ADC = $t22'$
ToD at client device DAC = $t23'$
ToD at client device antenna port = $t23$
ToA at antenna port of AP 2 = $t24$

TABLE 3

Measurements with AP 3:

ToD at AP 3 at antenna port = $t31$
ToA at client device antenna port = $t32$

TABLE 3-continued

Measurements with AP 3:

ToA at client device ADC = $t32'$
ToD at client device DAC = $t33'$
ToD at client device antenna port = $t33$
ToA at antenna port of AP 3 = $t34$ The following definitions apply to the equations set forth below for this example embodiment:

$D_1$=Distance between AP1 and the client device
$D_2$=Distance between AP2 and the client device
$D_3$=Distance between AP3 and the client device
$T_{Tx}$=Delay in client device Tx chain
$T_{Rx}$=Delay in client device Rx chain The roundtrip time from the antenna ports of the APs to the ADC of the client device 212 and from the DAC of the client device 212 to the antenna ports of the APs for AP 1, AP 2 and AP 3 may be described by respective equations (2), (3) and (4):

$$2\frac{D_1}{c} + T_{Rx} + T_{Tx} = (t'_{12} - t_{11}) + (t_{14} - t'_{13}) \qquad (2)$$

$$2\frac{D_2}{c} + T_{Rx} + T_{Tx} = (t'_{22} - t_{21}) + (t_{24} - t'_{23}) \qquad (3)$$

$$2\frac{D_3}{c} + T_{Rx} + T_{Tx} = (t'_{32} - t_{31}) + (t_{34} - t'_{33}) \qquad (4)$$

For simplicity and without any loss of generality, the STA may be assumed to be at position (x,y) and the three APs may be assumed to be located at ordinates (0,0), ($x_2$, 0) and ($x_3$,$y_3$), respectively. This results in basic differential distance equations (5) and (6):

$$D_{12} = \sqrt{x^2+y^2} - \sqrt{(x-x_2)^2+y^2} \qquad (5)$$

$$D_{13} = \sqrt{x^2+y^2} - \sqrt{(x-x_3)^2+(x-y_3)^2} \qquad (6)$$

where $D_{12}$ and $D_{13}$ are calculated according to equations (6a) and (6b) and $$D_{12}=D_1-D_2=\tfrac{1}{2}c((t'_{12}-t_{11})+(t_{14}-t'_{13})-(t'_{22}-t_{21})-(t_{24}-t'_{23})) \text{ and} \qquad (6a)$$

$$D_{13}=D_1-D_3=\tfrac{1}{2}c((t'_{12}-t_{11})+(t_{14}-t'_{13})-(t'_{32}-t_{31})-(t_{34}-t'_{33})) \qquad (6b)$$

While the differential distances as described in equations (6a) and (6b) are described ire a two-dimensional setting, the same equations for additional or fewer APs also apply in a three-dimensional or one-dimensional setting.

These two basic differential distance equations give rise to the two curves according to equations (7) and (8):

$$\begin{cases} y = \\ y = \dfrac{gx+h}{\sqrt{(e^2-1)x^2+2edx+d^2}} \end{cases} \text{where} \qquad (7), (8)$$

$$d = \frac{D_{12}}{2} - \frac{x_2^2}{2D_{12}}$$

$$e = \frac{x_2}{D_{12}}$$

$$g = \frac{D_{13}x_2}{D_{12}y_3} - \frac{x_3}{y_3} \text{ and}$$

-continued $$h = \frac{x_3^2 + y_3^2 - D_{13}^2 + D_{13}D_{12}\left(1 - \left(\frac{x_2}{D_{12}}\right)^2\right)}{2x_3}$$

Figure 4:
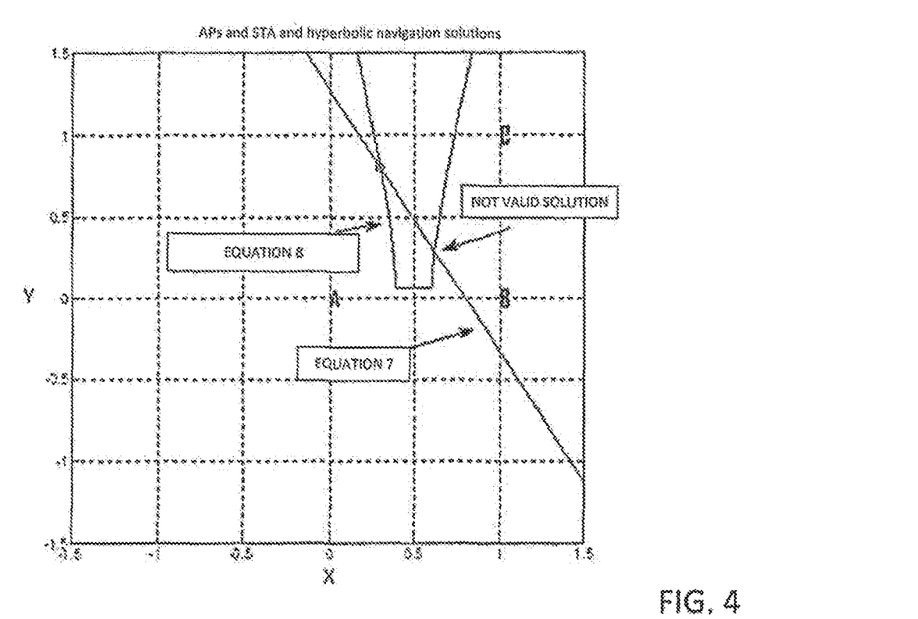
FIG. 4 is a graph of displacement along the x axis versus displacement along the y axis that is useful for describing the embodiment of the invention described with reference to FIGS. 2, 3, 5, 6A, 6B and 7.

The location of the client device 212 in two dimensions lies at the intersection of these two curves, as shown in FIG. 4. This methodology can be applied and generalized to more than two dimensions as well as to systems using more than 3 APs or STAs. One problem is that, in general, there may be two or more valid intersection points. An additional differential distance equation (i.e. to an additional AP or STA) can be used to resolve this ambiguity. The use of an additional AP or STA results in additional parabolic equation(s). Methods for resolving parabolic equations are similar to the methods used for hyperbolic navigation equations disclosed in a thesis by H. Senturk entitled "Performance Evaluation of Hyperbolic Position Location Technique in Cellular Wireless Networks," Air Force Institute of Technology, Wright-Patterson Air Force Base, Ohio, which is available from DTIC Online. The two-dimensional solution may also be useful where auxiliary information, such as a map is available to resolve a valid location from among multiple intersecting points of the curves resulting from the equations.

The method described with reference to FIG. 2 allows a client device to measure the arrival time and the departure time at the DACs and ADCs or at any fixed point in the transmit and receive circuitry. The RF Rx and Tx delays can then largely be ignored. This relaxes the calibration requirements on the client device. It is noted, however, that if the Rx RF delay of the client device depends on the Rx gain, then it may be desirable for the client device to compensate for any discrepancy In these delays as transmissions received from two different APs can result in different receive gain settings in the client device. Similarly, if the Rx and/or Tx RF delays depend on the channel and/or bandwidth used for the RTT measurement to the pair of APs, then the client device may need to compensate for those factors as well. Nevertheless, this methodology opens up the possibility to cancel all or some of the dependency on the client device's RF delays.

The RTT method for determining location is simple but may suffer from high overhead if many clients try to determine their location concurrently. This may be compounded if the client devices continually try to determine their location at a high rate. Moreover, in order for a client to determine its location using the RTT method, it not only receives signals but transmit signals. This can cause unnecessarily high power consumption in the client device which is typically powered by a battery having a relatively small capacity. The following embodiments of the invention disclose a method that enables a device to determine its location by only receiving signals from WiFi access points or other stations (STAs) in the wireless network or by transmitting only one message.

Because the embodiments of the invention described use one transmission or no transmissions by the client device they may significantly reduce overhead in the system as well as power consumption of the client devices.

Figure 3:
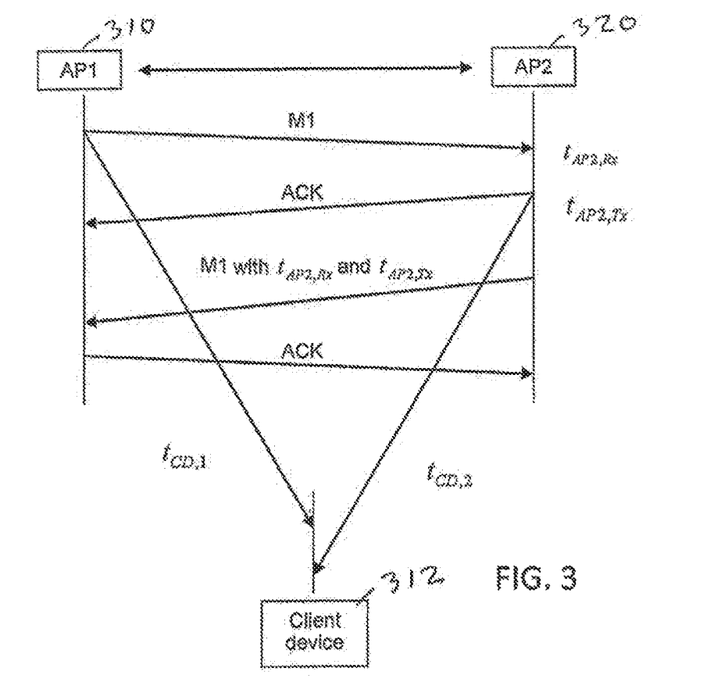

In a first example embodiment, shown in FIG. 3 the STA may determine its position without any transmissions. In this embodiment, each AP or STA (e.g. AP 310) scans its neighborhood and finds other APs or STAs (e.g. AP 320) that support the chant device receive only location scheme. Alternatively, the AP or STA may use the existing Fine Timing Measurement (FTM) mechanism from the IEEE 802.11v protocol or a variant of the FTM mechanism to find other suitable APs. It is contemplated that an AP may also learn about the support of neighboring APs by a Neighbor Report Element that the AP receives from the non-AP STAs in its basic service set (BSS) (e.g. its network). For the sake of clarity, the embodiments below are described in terms of actions performed by APs. It is contemplated, however, that any operation performed by an AP may also be performed by an STA having a known location.

The identified APs exchange information about their respective locations. Each AP (e.g. AP1 310 in FIG. 3) may periodically initiate a location measurement exchange by sending a special location measurement message as an FTM message. The other AP (e.g. AP2 320 in FIG. 3), which is still in its normal channel, receives this message and records the time at which the message was received at its antenna port. AP 320 then replies with an ACK and records when the ACK leaves its antenna port. Next AP 320 follows up with an FTM message containing the time stamps of when it received the location measurement message from AP 310 and when it transmitted the ACK. (AP 310 may or may not actually receive this message, it does not really matter. This message is intended only for the client device 312 to use for its location calculation). The above message exchange may be repeated multiple times to refine the timing measurement.

The APs 310 and 320 may repeat the whole procedure from the start of initial message exchange in an approximate period but in a non-asynchronous fashion, possibly somewhat randomized to avoid, lengthy collision conditions. It is contemplated that the special location measurement message may be preceded by a Request and ACK message (as shown in FIG. 2) to determine if the other AP (e.g. AP2 320 in FIG. 3, if the Request is sent by AP1 310, or AP1 310, if the Request is sent by AP2 320) is ready for the Location Message Exchange sequence. In addition, the exchange of the Request—ACK frames may start the time stamping processes in the respective devices.

In a variant of this method, the time stamps of when AP2 320 received the location measurement message from the AP1 310 and when AP2 320 transmitted the ACK, may be contained in the ACK itself. This would eliminate one message, the second message transmitted by AP2 320, from the procedure.

In another embodiment, the special location measurement message from AP1 710 that is received by AP2 320 might be used by AP1 310 to initiate the time stamping process. To facilitate this flexibility, when AP1 310 does not receive the time stamps from AP2 320, AP1 310 may initiate the message exchange again. Additionally, AP2 320, after transmitting the ACK message, may follow up by sending the special location measurement message to AP1 310.

Each AP may also broadcast (e.g. during the Beacon transmission time) its location as well as the location of its neighboring APs, the capability of the neighboring APs to support the Location Measurement procedure, and the next possible time when the Location Measurement procedure may be initiated. This broadcast may take place at any instant and, preferably, the information is broadcast with a regularity such that new client devices entering the AP's channel get this information in a timely fashion. Note that the AP may encode the location of its neighbor APs in relation to its own position and thus reduce the volume of data it transmits. Alternatively, a message may be sent periodically by some or all of the APs indicating the positions of all APs in the wireless network.

In this example, the client device 312 listens to these communications and may determine the wireless channel and the time at which the client device is to tune to the channel to receive the location measurement messages and the subsequent ACKs. It also listens to the follow up message from AP2 320 to get the time the location message was received by the AP2 320 on the channel on which it is camped, and the time that AP2 320 transmitted the ACK. With this timing information and the location of the APs 310 and 320 that the client 312 device extracts from the AP messages, the client device 312 may now estimate its location.

From the reception timing of each location measurement message and following ACK, the client device 312 computes the differential distance to the two APs 310 and 320. The method for doing this is as follows:

The client device computes the differential distance between the two APs as show in equation (9):

$$D_{12} = c(t_{CD,1} - (t_{CD,2} - T_{AP12} - (T_{AP2,Tx} - T_{AP2,Rx}))) \quad (9)$$

Where, as shown in FIG. 3.
$D_{12}$=The differential distance between AP1 and AP2,
$t_{CD,1}$=Time of arrival of the location measurement message from AP1 at the client device,
$t_{CD,2}$=Time of arrival of the ACK from AP2 at the client device,
$T_{AP12}$=Time of flight between AP1 and AP2,
$t_{AP2,RX}$=Time of arrival of the location measurement message from AP1 at AP2,
$t_{AP2,Tx}$=Time of transmission of the ACK from AP2, and
c=The speed of light.

Assuming a clear line of sight between AP1 210 and AP2 320, the time of flight between AP 310 and AP 320, $T_{AP12}$, may be calculated as shown in equation (10):

$$T_{AP12} = \frac{D_{AP12}}{c}. \quad (10)$$

Where DAP12 is the distance between AP1 310 and AP2 320. If there is not a clear line of sight between AP1 310 and AP2 320, further processing of the signals may be desirable to ensure that the calculation is based on the most direct signal (e.g. the list to arrive) and later multipath signals are ignored.

It is noted that very precise synchronization of the clocks of the three devices involved (AP1 310 and AP2 320 and the client device 312) is not required. This is because only the time differences measured close in time on the same device are relevant to the equation. Thus small discrepancies in the clocks among the devices 310, 320 and 312 tend to cancel out. Furthermore, the client device 312 does not need to make the measurements at the antenna port. It may, instead, make measurements at the ADCs or at any point in the receive circuitry that has a fixed delay from the antenna.

In a variant of this scheme the timing of the ACK transmission of AP 320 that receives the location measurement message from AP 310 in relation to the reception of that measurement message is predetermined with high accuracy and, in this case, no time-stamps may be transmitted. The client device, knowing the timing of the ACK relative to the original message, simply calculates the differential time distance as the time difference between the reception of the location measurement message and the ACK minus the ToF between the access points and the predetermined delay between the reception of the location measurement message and the ACK.

The STA measures such differential distances to multiple pairs of APs and uses them to estimates its location. The thesis by Senturk, referenced above, describes methods for calculating a location in one, two or three dimensions. To illustrate how this can be done, consider the following simple two-dimensional example with three APs, AP 1, AP 2 and AP 3. It is noted that this example may produce multiple intersecting points. A differential distance from at least one other AP or STA may be used to resolve to a single intersecting point.

For the sake of simplicity and without any loss of generality, the client device (STA) is located at coordinates (x,y) and the three APs are located at the coordinates (0,0) $(x_2,0)$ and $(x_3,y_3)$ respectively. We then have the basic differential distance equations (5) and (6):

$$D_{12} = \sqrt{x^2+y^2} - \sqrt{(x-x_2)^2+y^2} \quad (5)$$

$$D_{13} = \sqrt{x^2+y^2} - \sqrt{(x-x_3)^2+(x-y_3)^2} \quad (6)$$

where $D_{12}$ and $D_{13}$ are known from the measurement procedure described above.

These two basic differential distance equations give rise to the two curves described by equations (7) and (8):

$$\begin{cases} y = \dfrac{gx+h}{\sqrt{(e^2-1)x^2 + 2edx + d^2}} \\ y = \end{cases} \text{where} \quad (7), (8)$$

$$d = \frac{D_{12}}{2} - \frac{x_2^2}{2D_{12}}$$

$$e = \frac{x_2}{D_{12}}$$

$$g = \frac{D_{13}x_2}{D_{12}y_3} - \frac{x_3}{y_3}$$

$$h = \frac{x_3^2 + y_3^2 - D_{13}^2 + D_{13}D_{12}\left(1 - \left(\frac{x_2}{D_{12}}\right)^2\right)}{2x_3}$$

The location of the STA lies at the intersection or these two curves. Example curves are shown in FIG. 4. There may be more than one valid intersection (not counting the invalid solution shown in FIG. 4). As described above, to resolve the location measurement to a single point, it may be desirable to use additional AP differential distances to obtain additional hyperbolic equations and solve these equations using techniques described in the above-referenced thesis by Senturk.

An example of a three-dimensional scheme uses a pair of participating APs or STAs, A and B, and a mobile device C. In this example, APs A and B correspond to the respective APs 310 and 320 shown in FIG. 3 and the client device C corresponds to the client device (STA) 312.

AP A broadcasts a signal, received by AP B and device C. Upon receiving the signal, AP B broadcasts a signal that is received by client C. The signal transmitted by AP B, (e.g. the ACK shown in FIG. 3 or the subsequent signal, described above, sent by AP B) contains the difference, δ, in time between the signal arriving at AP B from AP A and the Signal departing from AP B.

At STA C, the difference in the arrival of the two signals is given by equation (11)

$$t_B - t_A = \|A-B\| + \delta + \|B-C\| - \|A-C\|, \quad (11)$$

which is equivalent to equation (12):

$$\|B-C\| - \|A-C\| = t_B - t_A - \|A-B\| - \delta. \quad (12)$$

Where $\|A-B\|=((X_A-X_B)^2+(Y_A-Y_B)^2+(Z_A-Z_B)^2)^{1/2}$ and the Xs, Ys and Zs are the x y and z coordinates of the APs A and B.

Because all of the quantities on the right hand side of equation (12) are known or measured, this is simply the equation of a hyperbola, symmetric about the line, AB, between the access points A and B.

If the signaling procedure is repeated but with an additional access point D (not shown in FIG. 3) replacing B, another hyperbola is obtained on which C should lie. In general, two hyperbolas intersect at two distinct points, so the procedure is repeated with another access point, E replacing D. The intersection of these three hyperbolas uniquely provide a position estimate of C. This analysis assumes that none of the APs A, B, D or E is collocated. Additionally, the pair of APs that the client device may use to determine its location need not have a common AP (e.g. AP A in the above example).

Methods for solving the three hyperbolic equations, centered on the lines AB, AD and AE, to obtain the estimated position of the client C are described in sections 2.5.2, of the above-referenced Senturk thesis at pages 33-36. Times are resolved into distances by multiplying the times by the speed of light, c.

The methods described above considers only the case when the client device listens to the traffic on one channel. It is contemplated, however, that the client device may listen to traffic and location messages on multiple channels, thereby possibly increasing the number of location measurements it processes.

The information that is broadcast by AP may include an indication of the channel on which both the transmitting AP and the neighbor APs will next broadcast the information. In addition, this information may include the time stamp of the transmission time of the message by the broadcasting AP as the transmission timestamp of the neighboring APs. Alternatively, the broadcast times of the neighbor APs may be predetermined relative to the broadcast time of the current AP. Knowing these times allows a client device to change the channel if it chooses to listen to the information transmitted by the neighbor APs in order to speed up its location determination. For example, it may measure Received Carrier Power and the location of the AP. As described below, knowing the approximate timing of the message may also allow the client device to sleep until the next transmission to preserve battery life.

Figure 5:
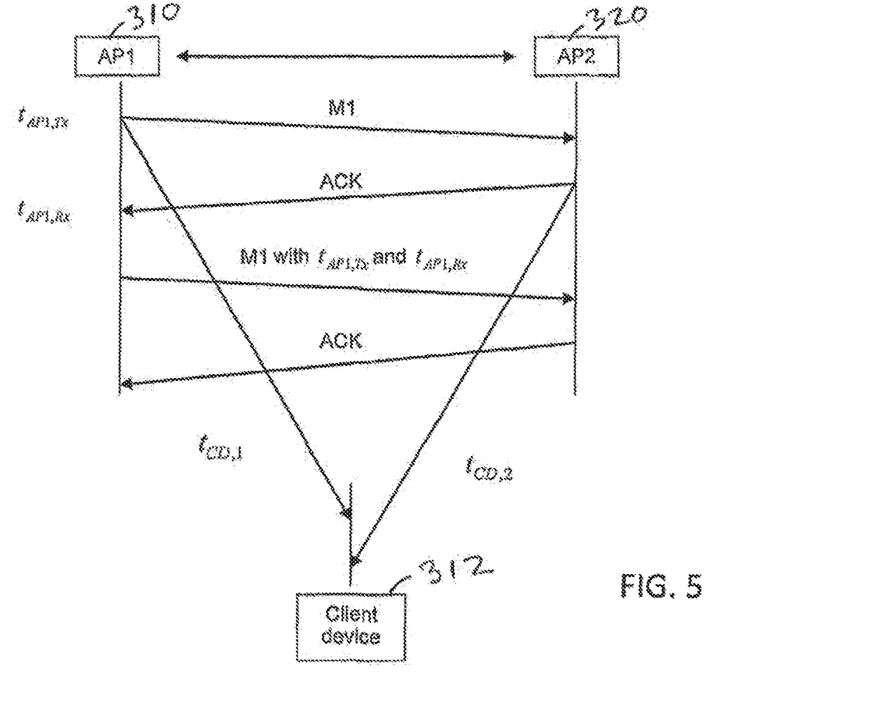

As shown in FIG. 5, AP1 310 transmits a Location Message M1 to AP2 320. AP2 320 responds to the message M1 by sending an ACK to AP1 310. AP2 then sends a second Location Message M1 containing the actual transmission time of the first Location Message, M1, and the reception time of the ACK message transmitted by AP2 320 in response to the first location message. Using this information as well as the actual time of reception, by the client device 312 of the same location measurement message and the following ACK message, the client device computes it's differential distance to the two APs involved.

The client device may computes its differential distance with respect to the two APs 310 and 320 as shown in equation (13):

$$D_{12}=c(t_{CD,1}-(t_{CD,2}-(t_{AP1,Rx}-t_{AP1,Tx}-T_{AP12})))\qquad(13)$$

where $t_{CD,1}$=Time of arrival of the location measurement message from AP1 at the client device, $t_{CD,2}$=Time of arrival of the ACK from AP2 at the client device, $T_{AP12}$=Time of flight between AP1 and AP2, $t_{AP1,Tx}$=Time of transmission of the location measurement message from AP1

$t_{AP1,Rx}$=Time of arrival of the ACK from AP2 at AP1, and c=the speed of light The rest of the scheme is the same as the method described above with reference to FIG. 3, in one, two or three dimensions.

Furthermore, the message exchange may include multiple transmissions a Location Message M1 (that includes the transmission time of the last M1 message and the reception time of it's ACK), the client device can use the content of the messages (timing information) along with the actual reception time of the messages and their ACK's at the client device 312 as described above with reference to equation (13) to refine the measurement of its differential distance with the two AP's 310 and 320.

In addition, AP2 320 may compute the distance DAP12, which is equivalent to $D_{12}$, using equation (1). AP2 may then use a triangulation method to compute its location if the location of some APs is well known (possibly through GPS). This mechanism allows an easy deployment of location services where the location of some APs is known and other APs compute their location using RTT and triangulation methods.

A possible problem with the above-described asynchronous method for receive only client device location is that the client device may need to be continually receiving when it wants to be able to know its current position. That is, it may not be able to enter a sleep mode if it does not want to miss some location measurement opportunities. In one contemplated variant of the above scheme, the AP pairs agree on certain periodic times when they will communicate on a channel to exchange location measurement messages. Alternatively, one AP in an AP pair may signal when it is planning to initiate the next location measurement exchange. Either of these variants may be part of a detailed protocol specifying how the APs agree and communicate at times and how they convey this information to the client device.

The following is a high-level description of the portion of the protocol. Once an AP has formed a pair with another AP it sets up a periodic communication to send location messages to the other AP. The APs negotiate on what channel(s) and with what bandwidth(s) these communications will take place. The APs also agree of the nominal timing and periodicity of the communications. It is contemplated that the timing and periodicity may be set by both APs or by one of the APs in the AP pair (e.g. AP 310 in FIG. 5). This is because the message sequence shown in FIG. 5 does not require the other AP to transmit any special message (e.g. AP 320 in FIG. 5). This is the case even if the message sequence in FIG. 5 is preceded by an exchange of Request—ACK frames (as shown in FIG. 2) that is initiated by AP 310. The schedule may be convey by a Schedule Element that may be included in the message M1 and also may be included in the Neighbor Element that may be broadcast by the AP, or in any other Broadcast message.

The Schedule Element along with any additional information may include the information related to the start of next Location message Exchange, the periodicity of the message exchange and the identities of one or both the devices involved in the message exchange (e.g. MAC address, BSSID . . . etc.). The parameters that may be included in the Schedule Element may be conveyed by any additional frame(s) and might not be limited to the Schedule Element. To the extent they can, the APs manage the traffic in their respective basic service sets (BSSs) (i.e. the AP and all associated STAs) so that each AP is available to communicate with its paired AP at the time for the synchronization communication. In this example embodiment, for a short period of time that one AP, AP 320, is to receive the initiating synchronization message from the other AP, AP 310, AP 320 ceases to transmit and listens for that synchronization transmission. Likewise AP 310, which sends that initiating synchronization message, ceases other transmissions and instead transmits the synchronization message.

After the initiating location message has been sent, AP 320 responds with an ACK as in the asynchronous method. Similarly, AP 320 may follow up with a message containing the time stamps of the reception time of the location message and the transmission time of the ACK or this information may be contained in the ACK.

AP 310 may then send a message containing the time stamp of the location measurement message it sent earlier as well as the time it received the ACK from AP 320. Similarly, the AP 320 may respond with a message containing the timestamp of its location measurement transmission. In this instance, AP 320 may also include information about the scheduling of its next beacon, including its the time and periodicity of the beacon. Likewise, the AP 310 may send a follow up message informing the AP 320 as to the scheduling of its beacon transmissions. This beacon timing information may be passed on by the AP to the client devices in its BSS so that they know the timing of the beacons of the AP and its neighboring APs.

Figure 7:
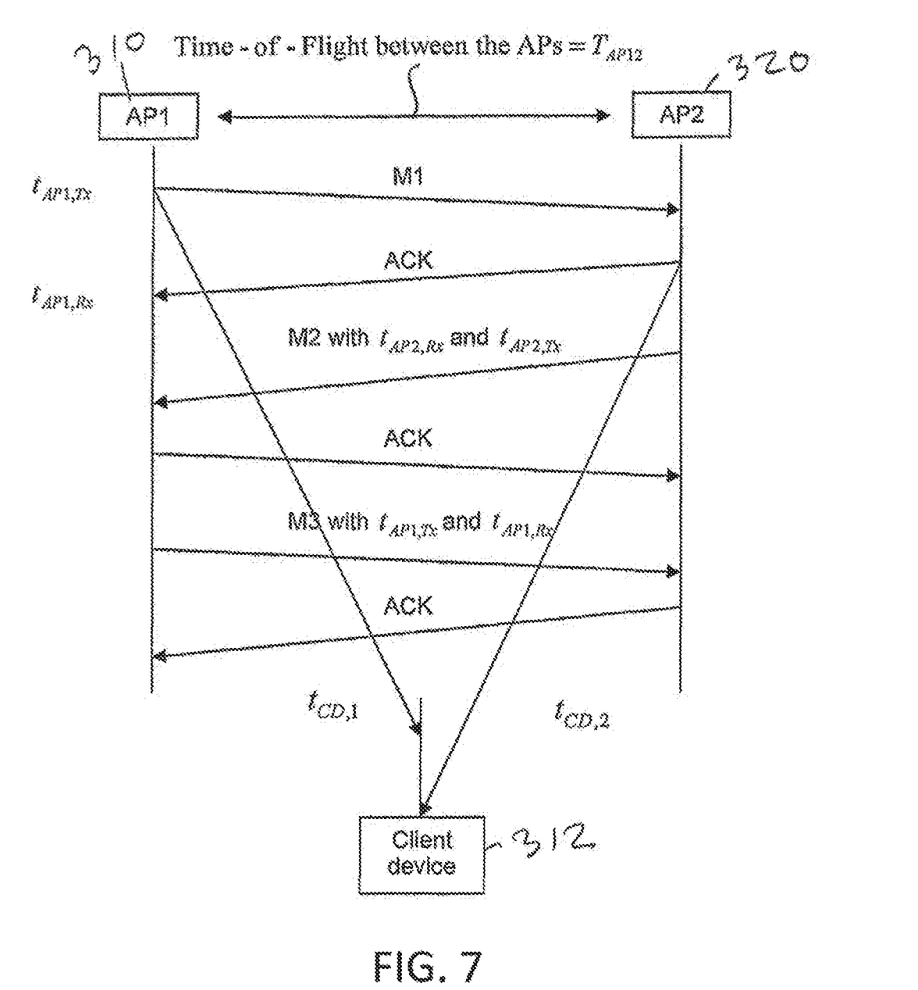

Another alternative is shown in FIG. 7. After the initiating local message, M1, has been sent by AP1 310, AP2 320 responds with an ACK as in the asynchronous method, AP2 320 may follow up with a message, M2, containing the time stamps of the reception time of the location message and the transmission time of the ACK. Alternatively, this information may be contained in the ACK.

AP1 310 may then send an ACK followed by a message, M3, containing the time stamp of the location measurement message that it sent earlier a well as the time it received the ACK from AP2 320. Similarly, the AP 320 may respond with an ACK. The messages M2 and/or M3 may include information about the scheduling of its next beacon, including its next beacon time and periodicity. In this embodiment, the client device 312 may listen to all of the messages and calculate its position using the timing data in from messages M2 and/or M3.

In particular, the client device may compute the differential distance between the two APs as shown in equation (14):

$$D_{12}=c(t_{CD,1}-t_{CD,2}+\tfrac{1}{2}(t_{AP1,Rx}+t_{AP2,Tx}-t_{AP1,Tx}-t_{AP2,Rx})) \quad (14)$$

Where $t_{CD,1}$=Time of arrival of the location measurement message, M1, from AP1 at the client device, $t_{CD,2}$=Time of arrival of the ACK from AP2 at the client device, $t_{AP1,Tx}$=Time of transmission of the location measurement message, M1, from AP1, $t_{AP1,Rx}$=Time of arrival of the ACK from AP2 at AP1

$t_{AP2,Rx}$=Time of arrival of the location measurement, M1, message from AP1 at AP2

$t_{AP2,Tx}$=Time of transmission of the ACK from AP2, and c=The speed of light.

As with the embodiment described with reference to FIG. 5, the beacon timing information may be passed on by the AP to the client devices in its BSS so that they know the timing of the beacons of neighboring APs.

The APs broadcast certain information to the client devices so that each client can compute its location. This information includes:

The location of the AP

For each AP with which the AP is paired:
   The (approximate) time to the next location measurement transmission with this AP.
   The nominal periodicity of the location measurement transmissions with this AP.
   The channel and bandwidth choice for the location measurement transmission with this AP
   The differential location of the paired AP.

Assuming a maximum relative distance of 1 km. With 17 bits per x and y dimension, the differential x–y distance may be specified with an accuracy of less than 1 cm. Assuming a maximum relative height of 250 m. With 14 bits, the relative height may be specified with an accuracy of less than 1 cm.

It is noted that this information does not need to be included in every beacon but only in beacons transmitted at times so that new client devices will be able to compute their locations in a timely fashion and so that if any client device loses track of the timing and periodicity of the location measurements it can obtain this information from the beacon broadcasts of its AP.

In another alternative embodiment of the invention, the AP may not include the location of the neighboring APs. The client device may, instead, obtain this information from the beacon transmissions of the neighboring APs. In this case, however, in order to avoid the client device having to scan for the neighboring APs, the transmitted message may also include information about when and on what channel the neighboring APs beacon transmissions will occur. If the maximum spacing of the beacons is, for example, 10 seconds and the precision of the next transmission time is, for example 10 μs, then 19 bits may be used express the timing of the next beacon and possibly another 19 bits may be used to express the periodicity of the beacon. The alternative, as described above, is to include the relative location of the neighboring AP(s). If the maximum distance between APs may be 1 km (in x, y and z dimensions) and their location is to be estimated with the precision of one cm, the transmitted relative distance would use 51 bits. Thus there could be some bandwidth saving made by including the timing of the neighboring APs beacons instead of providing their relative locations. The client, however, may need to switch between channels in order to pick up all the information used to compute its location. (In addition to the switching it would do to listen to the location measurement transmissions).

The client device receives the above broadcast information from an AP it is listing to. Based on this information it determines when and on what channel it will receive the location measurement transmissions. Once it has this information, the client device may turn off its receiver part of the time and therefore save battery power.

The location calculation for the client device is otherwise the same here as in the asynchronous method.

Figure 6A:
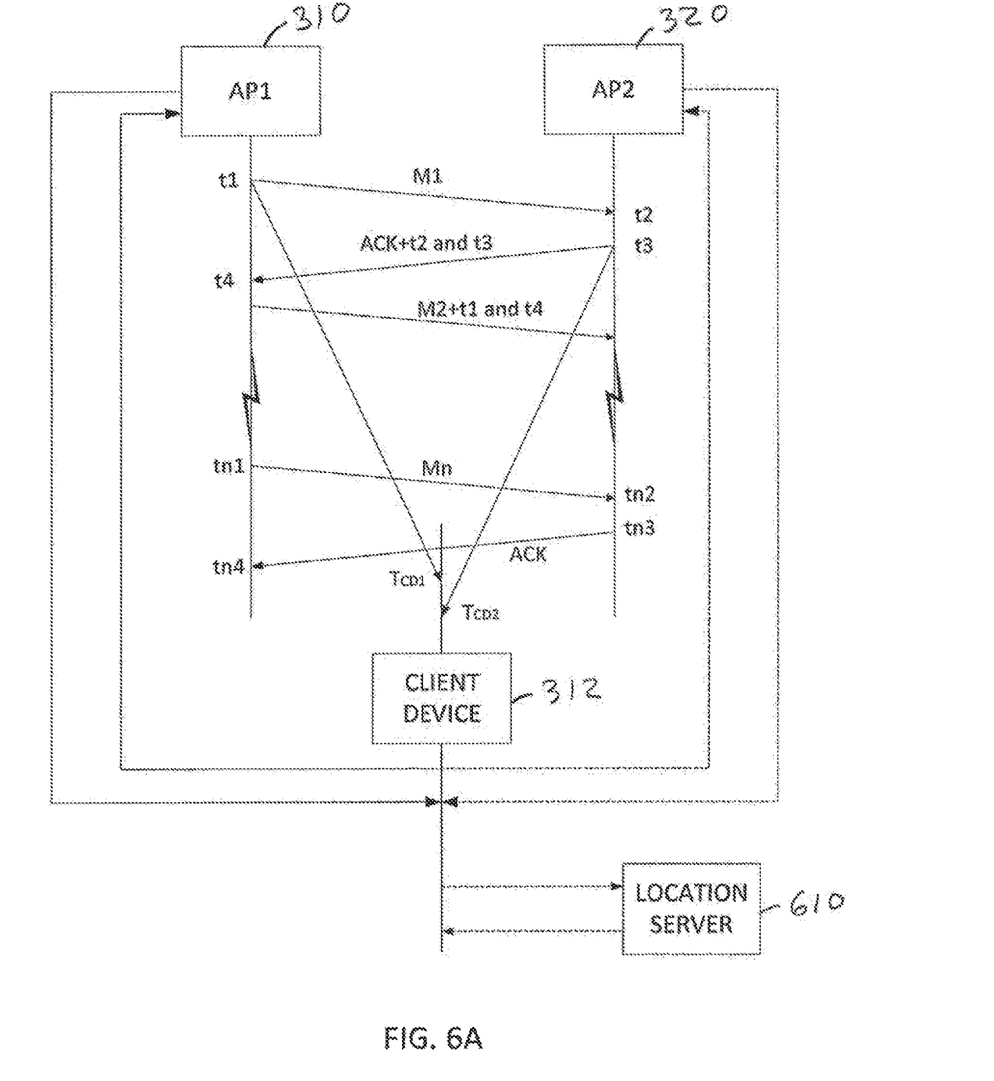
Figure 6B:
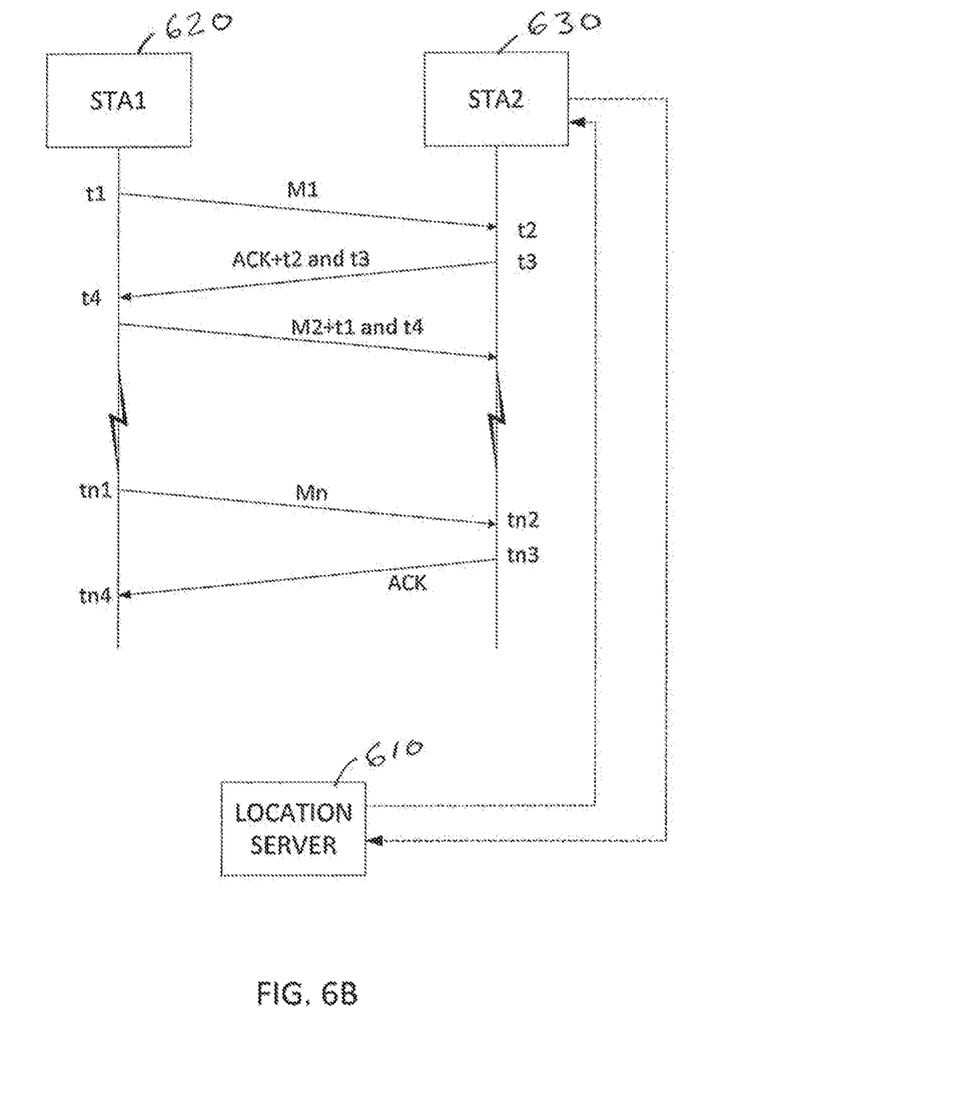

Other variants of this scheme are shown in FIGS. 6A and 6B. The variant shown in FIG. 6A, employs access points 310 and 320 and the client device 312 and uses hyperbolic equations. The embodiment shown in FIG. 6B employs stations STAs 620 and 630 and uses parabolic equations.

In The embodiment shown in FIG. 6A, the client device 312 may be coupled to a location server 610 or to one of the APs 310 or 320. All connections to client device 312 may be via a network, for example, a wired link or a wireless link.

Some of the information, described above, that otherwise would have been transmitted over-the-air on the WiFi channel may be communicated to (and from) the location server 610 or one of the APs 310 or 320 on those other wired and/or wireless links. Examples of the information that may be communicated to the location server 610 or one of the APs include the measured time stamps and the locations of the access points 310 and 320. The location server 610, AP1 310 or AP2 320 may also perform the majority of the location calculations. This may be advantageous where it is preferred to off-load the calculations from the client device 312.

In the example shown in FIG. 6A, at time t1, AP1 310 sends the Location Message, M1, to AP2 320. At time, t2, AP2 320 receives the Location Message. At time t3, AP2 320 responds with an ACK that may include values for the times t2 and t3 of the current message exchaiige or of a previous message exchange. At time t4, AP1 310 receives the ACK and at time t5, it responds by sending another Location Message, M2, with the times t1 and t4. As described above, using the values $T_{CD1}$ and $T_{CD2}$ and either the values t2 and t3 or the values t1 and t4, the client device 312 may calculate its position.

The calculations described above, however, may be complex for the client device. To reduce this burden, the client device may provide this information to the location server 610, to AP1 310 or to AP2 320. Any of these devices may perform the calculations described above to determine the location of the client device 312. Whichever device performs the calculation may then send the location information to the client device via the wireless network or by a wired network. Additionally, the client device may also provide the Location information or the identification of the devices (Ex: MAC address) of the network device that made the timing measurements to allow for the location computation device to have a reference of the device. For example, if t1, t4 are sent, then the location or identification of AP1 is sent, along with $T_{CD1}$ and $T_{CD2}$ and the identification of client device. The accuracy of the measurement may be further improved by including an estimate of the errors in the time measurements in the information provided to compute the location.

If the data is sent by the client device 312 to AP1 310 or AP2 320, it is desirable that it not be sent during the fine timing message (FTM) exchange. As shown in FIG. 6A, the exchange begins with message M1 and ends with message Mn. The last FTM has a dialogue token of 0 to indicate that it is the last message. In one implementation, the client device 312 may wait to send the location data to AP1 310, AP2 320 or location server 610 until after this last message has been transmitted. This timing prevents interference with the FTM exchange. Alternatively, the client device 312 may send this message before the last message if the client device 312 knows the beacon scheduling of the APs 310 and 320. A Client device may choose to send the timing information to the device to do the computation based upon the signaling in the FTM Message which indicates that the device sending the FTM message can take data from the client to compute the location from the client or the client may be pre-configured to make such a transfer of the timing information.

As described above, with reference to FIG. 2, the location determination may be made via a RTT calculation, using parabolic equations. This example is shown in FIG. 6B. This implementation includes stations STA1 620 and STA2 630 as well as location server 610. Desirably, one of STA1 620 and STA2 630 is a stationary device with a known position. STA1 620 may be an AP and STA2 630 may be a mobile device. Alternatively, STA2 630 may be an AP and STA1 620 may be a mobile device. As described above with reference to FIG. 2, for a mobile device to accurately calculate its position using the parabolic technique, it desirably calculates its position with respect to multiple fixed STAs having known locations. FIG. 6B illustrates the message exchange between one fixed STA and one mobile STA. To resolve ambiguity in the position, the messages of this exchange may be interleaved with or followed by messages transmitted between the mobile STA and ore or more other STAs neighboring the fixed STA.

In the embodiment shown in FIG. 6B, STA1 620 is fixed and STA2 630 is a mobile device. The FTM message exchange in FIG. 6B is essentially the same as in FIG. 6A. In this embodiment, however, the position of STA2 630 is calculated based on the position of STA1 620. Once it has obtained the RTT information, as described above with reference to FIG. 2, STA2 630 transmits the information to the location server 610 (which may be any STA) or to STA1 along with the Location or identification (Ex: MAC address) of STA1. As described above with reference to FIG. 6A, this transmission may occur after the last message in the FTM exchange or, at any time even during the FTM exchange. The transmission is desirably timed not to interfere with the FTM exchange. Additionally, the STA2 may be signaled by STA1 in the FTM Message to send its measured time stamps to the Location Server or STA1 or to any other STA that is reachable to STA2.

It is contemplated that the messages used in the message exchange may be configured to accommodate either hyperbolic or parabolic location determinations. The example message may have a flag bit indicating whether the parabolic or hyperbolic technique is being used. Each message may also transmit the various transmit and receive time values, as described above, together with an indication of the maximum error in each of the time values. The messages may also provide the MAC addresses of the STAs in the message and the media access control (MAC) address of STA originating the message. The content including the time stamps, identification (or location) details of the STAs, parabolic or hyperbolic computation flag, and errors in the time stamps, can be carried in an "Information Element", and a single message can have one or more of these "Information Elements".

In any of the embodiments, described above with reference to FIGS. 3-6A and 7, AP 310, when it receives the signal broadcast from AP 320, may estimate the RTT and, knowing the true distance from AP 320 or the processing time of the time stamps in the device, may estimate an error in the RTT calculation. In response to this estimated error, AP 310 may 1) issue a warning that multipath errors may be present, 2) provide an estimate of the magnitude of the multipath error or 3) provide a confidence measurement of the estimated RTT which includes the multipath error. This information may be provided by AP 310 to the client 312 for use in the position calculation. If multipath error is detected, the signaling procedure may be repeated a number of times, possibly using different frequencies and possibly in different frequency bands (e.g. 2.4 GHz and 5 GHz for WiFi) to ameliorate the multipath error.

Figure 8:
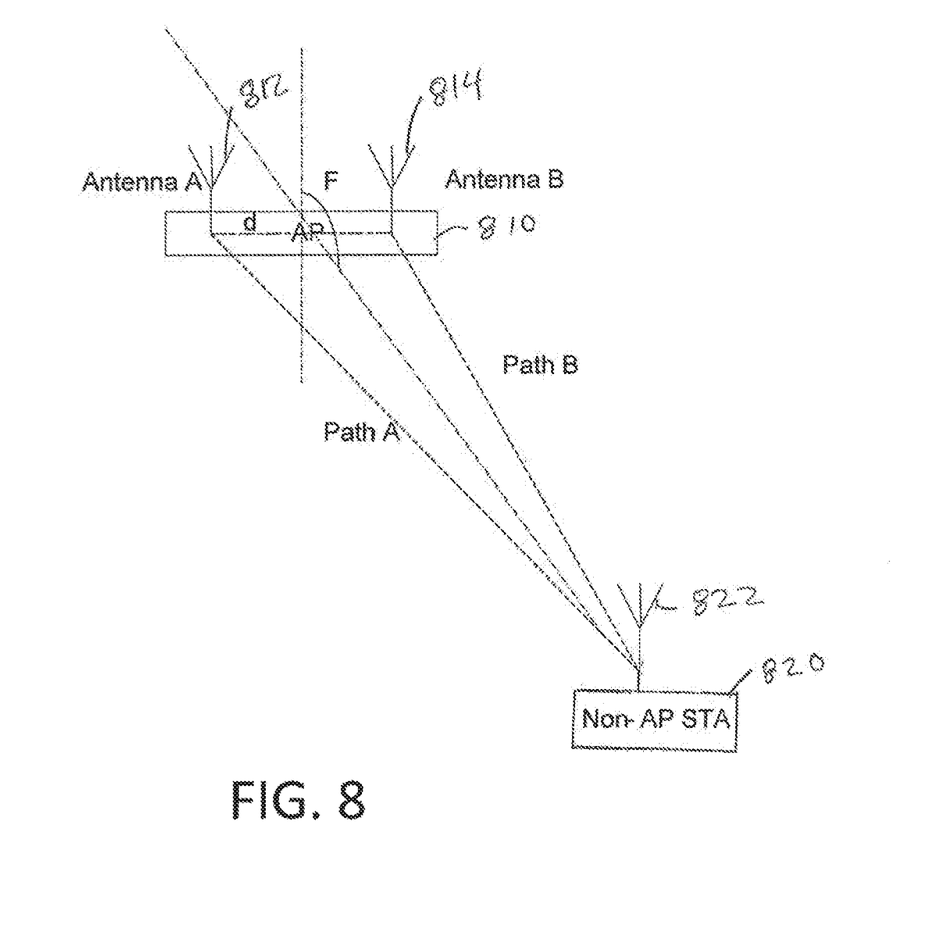

An alternative method for augmenting a location determination is shown in FIG. 8. This method utilizes sounding signals sent as a part of a beamforming operation used by certain wireless technologies (e.g. 802.11v and 802.11ac) to implement steered signaling between a base station and a mobile device.

The example method assumes that a mobile STA can receive a signal from one or more APs that have multiple, antennas. An example system in which the method may be implemented is shown in FIG. 8. The system includes a single AP 810 with two antennas 812 and 814 and non AP-STA 820 with one antenna 822. According to this method, the transmitting AP has a known orientation and location, and a known antenna geometry. If a transmitting AP has multiple antennas, separate sounding signals may be transmitted identifiably from each antenna so that the receiving STA can determine the channel characteristics of the transmitted signal through the associated antennas.

The sounding signals may be sent periodically to determine the characteristics of the channel between the AP 810 and the STA 820. Upon receiving the sounding signal for the antennas, the STA 820 sends a response to the AP 810 with an measure of the channel quality and a matrix that addresses any phase difference between the sounding signals received from the antennas 812 and 814. The AP 810 uses the quality measure and the matrix to form a steered beam transmission channel to the STA 820.

An example embodiment may use these sounding signals to at least partially determine the location of the STA 820 relative to one or more APs 810. In the example embodiment, the received sounding measurements are used to determine the phase difference between the signals that are transmitted through the available transmit antennas 812 and 814. This angle defines a set of lines of constant phase difference that identify possible signal paths between the transmitting AP and receiving STA. In the example shown in FIG. 8, with two antennas, the non-AP STA receives sounding signals from the AP sent concurrently via the antennas 812 and 814

By analysis of the respective times at which the signals are received (and the relationship between them), the STA 820 may determine, for example, that the signal from antenna 812 (path A) is delayed with respect to the signal from antenna 814 (path B) by an amount approximated by $d \cdot \sin(\phi)$, where d is the distance between the antennas 812 and 814 of the AP 810. From this measurement, the STA 820 may deduce that the angle of the signal leaving the AP is $\phi$ radians (or also possibly $\phi+\pi$ radians). This angle is the angle of a straight-line path from a perpendicular line drawn through a central point between the two antennas, as shown in FIG. 8.

Similarly, the timings of reflected (multipath) signals can also be extracted, to determine their angles of departure. In general, the direct signal transmitted by an antenna is the first one to arrive at the antenna. Any later-arriving signals from that antenna represent multipath distortion. If the geometry of the area in which the signals are received is known, the angles at which the multipath signals arrive may be used to augment the location determination made by the STA 820.

The phase angle calculation may be ambiguous across complete cycles of the measured signal. However, the number of possible locations that satisfy the a positioning solution may still be smaller than would apply without the use of the measurement. For example, as described above, the angle of a pair of sounding signals received by STA 820 may be $\phi$ radians or $\phi+\pi$ radians. These angles, however, provide additional constraints which can be used with other angle measurements or with the parabolic or hyperbolic methods described above, to further refine the position of the STA 820 relative to one or more APs.

Where a larger number of APs is used, angles from multiple sets of antennas, each associated with a respective AP, can be calculated. Alternatively, where a single AP includes more than two antennas the phase angle to the single AP may be measured more accurately. In this embodiment, the angle $\phi$ may be an angle relative to a centroid of the multiple antennas. When geometry, permits, these measurements may further limit the number of possible locations of the STA 820 in relation to reference AP 810.

When the STA 820 processes signals from multiple APs 810 (not shown), the possible locations of the STA may be the further reduced by applying triangulation based on the respective determined angles between the STA 820 and each of the APs 810.

If signals from a sufficient number APs are measured, it may be possible to determine the location of the STA uniquely, but even if the location cannot be determined uniquely, the bearing estimates made by this method may be used to augment a position estimate made using another technique, such as the parabolic and hyperbolic techniques described above, by reducing the number of possible solutions that fit both sets of data.

Where measurements are made using other techniques, information about the bearing of the received signal may also be used to evaluate whether multipath error is present. An estimate of the amount of multipath, or a confidence relating to that measurement, and can be relayed to the STA 820 for use in the position calculation employing one of the other methods.

The measurement procedure can be effected multiple times using the same APs, with the mean values of the angles used in the position calculation. The procedure can be repeated on different frequencies and possibly on a different band (e.g. 2.4 GHz and 5 GHz for Wi-Fi) to ameliorate any problems in the channel between the APs 810 and the STA 820, such as multipath.

It is also contemplated that the STA 820 may be fitted with multiple antennas (not shown). In this case further information about the radio propagation paths between the AP 810 and STA 820 may be exploited. In particular the STA 820 may be able to obtain more accurate information about the angle of arrival of the received signals by processing each of the arrived signals by each of its antennas.

All embodiments described above concern determination of a location of a client device relative to one or two fixed APs or STAs. While these locations may be used to determine an absolute location of the client device, more accurate positioning information may be obtained by obtaining and combining additional location determinations.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for determining a location of a mobile station relative to an access point having a known location, comprising:
    receiving, by the mobile station, at a first reception time a first signal from a first antenna of the access point;
    receiving, by the mobile station, at a second reception time a second signal from a second antenna of the access point having a known distance from the first antenna;
    determining, by the mobile station, a phase difference between the first signal and the second signal;
    determining, by the mobile station, an angle formed between a first line and a second line, wherein the first line comprises a straight-line path extending from a midpoint of a connecting line between the first antenna and the second antenna and the mobile station, and wherein the second line is perpendicular to the connecting line at the midpoint, based on the first reception time, the second reception time, and the phase difference between the first signal and the second signal; and
determining, by the mobile station, a location of the mobile station based on the known location of the access point and the angle of the straight-line path.

2. The method of claim 1, wherein the first signal comprises a first sounding signal, and the second signal comprises a second sounding signal.

3. The method of claim 1, further comprising:
receiving, by the mobile station, at a third reception time a third signal from the first antenna, wherein the third reception time is after the first reception time; and
determining, by the mobile station, an angle of arrival of the third signal at the mobile station based on the third reception time and a geometry of an area around the mobile station; and
refining, by the mobile station, the determined location of the mobile station based on the angle of arrival of the third signal at the mobile station.

4. The method of claim 1, further comprising:
receiving, by the mobile station, at a third reception time a third signal from the first antenna of the access point;
receiving, by the mobile station, at a fourth reception time a fourth signal from the second antenna of the access point;
determining, by the mobile station, a phase difference between the third signal and the fourth signal; and
determining, by the mobile station, a second angle formed between a straight-line path extending from the midpoint of the connecting line between first antenna and the second antenna and the mobile station, and the line that is perpendicular to the connecting line at the midpoint, based on the third reception time, the fourth reception time, and the phase difference between the third signal and the fourth signal.

5. The method of claim 4, further comprising:
determining, by the mobile station, a mean angle of a straight-line path extending from the midpoint of the connecting line between first antenna and the second antenna to the mobile station and the line that is perpendicular to the connecting line at the midpoint, based on the determined angle and the determined second angle.

6. The method of claim 5, wherein determining, by the mobile station, the location of the mobile station based on the known location of the access point and the angle of the straight-line path comprises:
determining, by the mobile station, the location of the mobile station based on the known location of the access point and the mean angle of the straight-line path extending from the midpoint of the connecting line between first antenna and the second antenna to the mobile station and the line that is perpendicular to the connecting line at the midpoint.

7. The method of claim 4, wherein the third signal is received on a different frequency than the first signal, and the fourth signal is received on a different frequency than the second signal.

8. The method of claim 1, further comprising:
determining, by the mobile station, a distance of the mobile station from the access point based on the known location of the access point and one or more of the first arrival time and the second arrival time.

9. The method of claim 1, comprising:
determining, by the mobile station, a distance of the mobile station from the access point based on the known location of the access point and an angle described by an angle of arrival of the first signal and an angle of arrival of the second signal.

10. A method for determining a location of a mobile station relative to an access point having a known location, comprising:
receiving, by the mobile station, at a first reception time a first signal from a first antenna of the access point;
receiving, by the mobile station, at a second reception time a second signal from a second antenna of the access point having a known distance from the first antenna;
receiving, by the mobile station, at a third reception time a third signal from a third antenna of the access point having known distances from the first antenna and the second antenna;
determining, by the mobile station, a first phase difference between the first signal and the second signal;
determining, by the mobile station, a second phase difference between the first signal and the third signal;
determining, by the mobile station, an angle of a straight-line path that extends from a midpoint of a centroid between the first antenna, the second antenna, and the third antenna to the mobile station and a perpendicular line that extends through the midpoint of the centroid based on the first reception time, the second reception time, the third reception time, the first phase difference between the first signal and the second signal, and the second phase difference between the first signal and the third signal; and
determining, by the mobile station, a location of the mobile station based on the known location of the access point and the angle of the straight-line path.

11. The method of claim 10, further comprising:
determining, by the mobile station, a third phase difference between the second signal and the third signal;
wherein determining, by the mobile station, an angle of a straight-line path that extends from a midpoint of a centroid between the first antenna, the second antenna, and the third antenna to the mobile station and a perpendicular line that extends through the midpoint of the centroid based on the first reception time, the second reception time, the third reception time, the first phase difference between the first signal and the second signal, and the second phase difference between the first signal and the third signal comprises:
determining, by the mobile station, an angle of a straight-line path that extends from a midpoint of a centroid between the first antenna, the second antenna, and the third antenna to the mobile station and a perpendicular line that extends through the midpoint of the centroid based on the first reception time, the second reception time, the third reception time, the first phase difference between the first signal and the second signal, the second phase difference between the first signal and the third signal, and the third phase difference between the second signal and the third signal.

12. A mobile station comprising:
a wireless transceiver; and
a processor coupled to the wireless transceiver and configured with processor-executable instructions to:
receive at a first reception time a first signal from a first antenna of an access point having a known location;

receive at a second reception time a second signal from a second antenna of the access point having a known distance from the first antenna;
determine a phase difference between the first signal and the second signal;
determine an angle formed between a first line and a second line, wherein the first line comprises a straight-line path extending from a midpoint of a connecting line between the first antenna and the second antenna and the mobile station, and wherein the second line is perpendicular to the connecting line at the midpoint, based on the first reception time, the second reception time, and the phase difference between the first signal and the second signal; and
determine a location of the mobile station based on the known location of the access point and the angle of the straight-line path.

13. The mobile station of claim 12, wherein the first signal comprises a first sounding signal, and the second signal comprises a second sounding signal.

14. The mobile station of claim 12, wherein the processor is further configured with processor-executable instructions to:
receive at a third reception time a third signal from the first antenna, wherein the third reception time is after the first reception time; and
determine an angle of arrival of the third signal at the mobile station based on the third reception time and a geometry of an area around the mobile station; and
refine the determined location of the mobile station based on the angle of arrival of the third signal at the mobile station.

15. The mobile station of claim 12, wherein the processor is further configured with processor-executable instructions to:
receive at a third reception time a third signal from the first antenna of the access point;
receive at a fourth reception time a fourth signal from the second antenna of the access point;
determine a phase difference between the third signal and the fourth signal; and
determine a second angle formed between a straight-line path extending from the midpoint of the connecting line between first antenna and the second antenna and the mobile station, and the line that is perpendicular to the connecting line at the midpoint, based on the third reception time, the fourth reception time, and the phase difference between the third signal and the fourth signal.

16. The mobile station of claim 15, wherein the processor is further configured with processor-executable instructions to:
determining, by the mobile station, a mean angle of a straight-line path extending from the midpoint of the connecting line between first antenna and the second antenna to the mobile station and the line that is perpendicular to the connecting line at the midpoint, based on the determined angle and the determined second angle.

17. The mobile station of claim 16, wherein the processor is further configured with processor-executable instructions to:
determine the location of the mobile station based on the known location of the access point and the mean angle of the straight-line path extending from the midpoint of the connecting line between first antenna and the second antenna to the mobile station and the line that is perpendicular to the connecting line at the midpoint.

18. The mobile station of claim 15, wherein the third signal is received on a different frequency than the first signal, and the fourth signal is received on a different frequency than the second signal.

19. The mobile station of claim 12, wherein the processor is further configured with processor-executable instructions to:
determine a distance of the mobile station from the access point based on the known location of the access point and one or more of the first arrival time and the second arrival time.

20. The mobile station of claim 12, wherein the processor is further configured with processor-executable instructions to:
determine a distance of the mobile station from the access point based on the known location of the access point and an angle described by an angle of arrival of the first signal and an angle of arrival of the second signal.

21. A mobile station comprising:
a wireless transceiver; and
a processor coupled to the wireless transceiver and configured with processor-executable instructions to:
receive at a first reception time a first signal from a first antenna of the access point;
receive at a second reception time a second signal from a second antenna of the access point having a known distance from the first antenna;
receive at a third reception time a third signal from a third antenna of the access point having known distances from the first antenna and the second antenna;
determine a first phase difference between the first signal and the second signal;
determine a second phase difference between the first signal and the third signal;
determine an angle of a straight-line path that extends from a midpoint of a centroid between the first antenna, the second antenna, and the third antenna to the mobile station and a perpendicular line that extends through the midpoint of the centroid based on the first reception time, the second reception time, the third reception time, the first phase difference between the first signal and the second signal, and the second phase difference between the first signal and the third signal; and
determine a location of the mobile station based on the known location of the access point and the angle of the straight-line path from the perpendicular line that is parallel to at least one of the first antenna, the second antenna, and the third antenna and extends through a midpoint of the centroid between the first antenna, the second antenna, and the third antenna to the mobile station.

22. The mobile station of claim 21, wherein the processor is further configured with processor-executable instructions to:
determine a third phase difference between the second signal and the third signal; and
determine an angle of a straight-line path that extends from a midpoint of a centroid between the first antenna, the second antenna, and the third antenna to the mobile station and a perpendicular line that extends through the midpoint of the centroid based on the first reception time, the second reception time, the third reception time, the first phase difference between the first signal and the second signal, the second phase difference between the first signal and the third signal, and the third phase difference between the second signal and the third signal.

23. A non-transitory processor-readable storage medium having stored thereon processor-executable software instructions configured to cause a processor of a mobile station to perform operations comprising:
receiving at a first reception time a first signal from a first antenna of the access point;
receiving at a second reception time a second signal from a second antenna of the access point having a known distance from the first antenna;
determining a phase difference between the first signal and the second signal;
determining an angle formed between a first line and a second line, wherein the first line comprises a straight-line path extending from a midpoint of a connecting line between the first antenna and the second antenna and the mobile station, and wherein the second line is perpendicular to the connecting line at the midpoint, based on the first reception time, the second reception time, and the phase difference between the first signal and the second signal; and
determining a location of the mobile station based on the known location of the access point and the angle of the straight-line path.

24. A non-transitory processor-readable storage medium having stored thereon processor-executable software instructions configured to cause a processor of a mobile station to perform operations comprising:
receiving at a first reception time a first signal from a first antenna of the access point;
receiving at a second reception time a second signal from a second antenna of the access point having a known distance from the first antenna;
receiving at a third reception time a third signal from a third antenna of the access point having known distances from the first antenna and the second antenna;
determining a first phase difference between the first signal and the second signal;
determining a second phase difference between the first signal and the third signal;
determining an angle of a straight-line path that extends from a midpoint of a centroid between the first antenna, the second antenna, and the third antenna to the mobile station and a perpendicular line that extends through the midpoint of the centroid based on the first reception time, the second reception time, the third reception time, the first phase difference between the first signal and the second signal, and the second phase difference between the first signal and the third signal; and
determining a location of the mobile station based on the known location of the access point and the angle of the straight-line path from the perpendicular line that is parallel to at least one of the first antenna, the second antenna, and the third antenna and extends through a midpoint of the centroid between the first antenna, the second antenna, and the third antenna to the mobile station.

25. A mobile station, comprising:
means for receiving at a first reception time a first signal from a first antenna of the access point;
means for receiving at a second reception time a second signal from a second antenna of the access point having a known distance from the first antenna;
means for determining a phase difference between the first signal and the second signal;
means for determining an angle formed between a first line and a second line, wherein the first line comprises a straight-line path extending from a midpoint of a connecting line between the first antenna and the second antenna and the mobile station, and wherein the second line is perpendicular to the connecting line at the midpoint, based on the first reception time, the second reception time, and the phase difference between the first signal and the second signal; and
means for determining a location of the mobile station based on the known location of the access point and the angle of the straight-line path.

26. A mobile station, comprising:
means for receiving at a first reception time a first signal from a first antenna of the access point;
means for receiving at a second reception time a second signal from a second antenna of the access point having a known distance from the first antenna;
means for receiving at a third reception time a third signal from a third antenna of the access point having known distances from the first antenna and the second antenna;
means for determining a first phase difference between the first signal and the second signal;
means for determining a second phase difference between the first signal and the third signal;
means for determining an angle of a straight-line path that extends from a midpoint of a centroid between the first antenna, the second antenna, and the third antenna to the mobile station and a perpendicular line that extends through the midpoint of the centroid based on the first reception time, the second reception time, the third reception time, the first phase difference between the first signal and the second signal, and the second phase difference between the first signal and the third signal; and
means for determining a location of the mobile station based on the known location of the access point and the angle of the straight-line path from the perpendicular line that is parallel to at least one of the first antenna, the second antenna, and the third antenna and extends through a midpoint of the centroid between the first antenna, the second antenna, and the third antenna to the mobile station.

* * * * *